United States Patent [19]
Wagner

[11] 3,835,137
[45] Sept. 10, 1974

[54] FIBRINOLYTIC TETRAZOLO(1,5-C)QUINAZOLINES
[75] Inventor: Eugene R. Wagner, Midland, Mich.
[73] Assignee: The Dow Chemical Company, Midland, Mich.
[22] Filed: Oct. 13, 1972
[21] Appl. No.: 297,465

[52] U.S. Cl............................ 260/256.4 F, 424/251
[51] Int. Cl............................................. C07d 51/48
[58] Field of Search............................. 260/256.4 F

[56] References Cited
UNITED STATES PATENTS
3,389,137   6/1968   Moser et al...................... 260/256.4

*Primary Examiner*—Raymond V. Rush
*Attorney, Agent, or Firm*—Maynard R. Johnson

[57] ABSTRACT

Tetrazoloquinazoline compounds such as 5-[4-(dimethylamino)phenyl]-5,6-dihydro-tetrazolo(1,5-c)-quinazoline are prepared by the reaction of 5-(2-aminophenyl)tetrazole with a 4-dialkylaminobenzaldehyde. The compounds are useful as fibrinolytic agents.

2 Claims, No Drawings

FIBRINOLYTIC TETRAZOLO(1,5-C)QUINAZOLINES

BACKGROUND OF THE INVENTION

5-Substituted-tetrazolo(1,5-c)quinazolines and certain 5-hydroxy-5,6-dihydro-tetrazolo(1,5-c)quinazolines have been prepared by Postovskii et al., Khimiya Geterotsiklicheskikh Soedinenii, 2, 130 (1966) and 3: 944 (1967); and see Current Abstracts of Chemistry, 37 (340: 142673; 37 (337); 140057; and 39 (359) 1600 84-5.

The substituted 5-(2-aminophenyl)tetrazole employed as a starting material can be prepared by the reaction of anthranilonitrile with sodium azide and ammonium chloride, by the method of Finnegan et al., J. Am. Chem. Soc. 80,3908 (1958) with the addition of lithium chloride, according to Holland and Pereira, J. Med. Chem. 10, 149 (1967).

SUMMARY OF THE INVENTION

This invention is concerned with 5-[(dialkylamino)-phenyl]-tetrazoloquinazoline compounds and is particularly directed to 5-[4-(dimethylamino)phenyl]-5,6-dihydro-tetrazolo(1,5-c)quinazoline compounds of the formula:

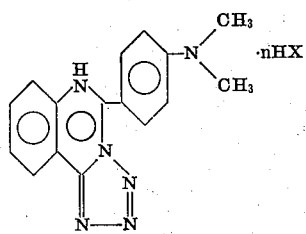

wherein n represents one of the integers zero and one, and X represents the anionic moiety of a pharmaceutically acceptable acid addition salt. The term "pharmaceutically acceptable salt" as herein employed refers to salts which are substantially non-toxic at dosage rates consistent with good pharmacological activity. Such pharmaceutically acceptable salts include non-toxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methane-sulfonic or p-toluenesulfonic acid.

The compounds of the invention are prepared by the reaction of 5-(2-aminophenyl)tetrazole with 4-(dimethylamino benzaldehyde. The reaction proceeds when the reactants are contacted and mixed, preferably in the presence of an inert organic solvent as a reaction medium. Suitable inert solvents include chloroform, benzene, methanol, ethanol, propanol and isopropanol, and other inert organic liquids in which the reactants are soluble, which liquids have a boiling point between about 0° and 130°C. Ethanol is the preferred solvent of choice. The reaction proceeds at temperatures from about 0° to about 130°C. The reaction proceeds at a desirably rapid rate at room temperature; in other cases it is desirable to heat the reaction mixture to the boiling temperature under reflux. The reaction is generally complete within about 5 minutes to about one hour, depending upon temperature and choice of solvent (if used). The product can be separated by conventional procedures, such as evaporation of reaction medium and unreacted aldehyde, or dilution and cooling of the reaction mixture to induce crystallization of the product. The product can be purified by conventional procedures such as recrystallization and washing.

The exact proportions of the reactants to be employed are not critical, some of the desired product being obtained when the reactants are combined over a wide range of proportions (e.g., a ten fold molar excess of either reactant). The reaction consumes the reactants in equimolar proportions, in a preferred procedure, the reactants are employed in proportions from substantially equimolar amounts of each reactant to about 10 percent molar excess of the benzaldehyde reactant.

The pharmaceutically-acceptable salts are conveniently prepared by dissolving the free base compound in a solvent such as dimethylformamide and thereafter adding an excess of a pharmaceutically acceptable acid such as hydrochloric, hydrobromic, sulfuric, malic, maleic or p-toluenesulfonic acid or the like until precipitation of the product is complete. The product can be separated by conventional procedures such as evaporation, filtration or centrifugation and purified by conventional procedures such as recrystallization.

The free base compound can be prepared from the salts by mixing the salt or a solution of the salt in a minimal amount of methanol with an excess of an aqueous base such as sodium hydroxide, potassium hydroxide or sodium carbonate. The free base can be separated by conventional procedures, and purified by conventional procedures such as recrystallization or it can be converted to pharmaceutically acceptable salt.

DESCRIPTION OF THE PREFERRED EMBODIMENTS

The following examples illustrate the invention but are not to be construed as limiting the same.

EXAMPLE 1

5-(2-Aminophenyl)tetrazole (25 grams; 0.15 mole) was dissolved in 200 milliliters of ethanol. 25 Grams (0.16 mole) of 4-(dimethylamino)benzaldehyde was added and the resulting solution was warmed gradually until the aldehyde had dissolved, then allowed to cool to room temperature. The product crystallized in the reaction mixture on standing 18 hours at room temperature. The mixture was filtered, and the product collected on the filter. The 5,6-dihydro-5-[4-(dimethylamino)phenyl]-tetrazolo(1,5-c)quinazoline product was found to melt at 181°-182°C. The product was recrystallized from acetone and from ethanol. The structure of the product was confirmed by infrared spectroscopy, nuclear magnetic resonance analysis, and by elemental analysis. Elemental analysis of an aliquot recrystallized from ethanol showed carbon, hydrogen and nitrogen contents of 67.25, 4.62 and 28.22 percent, respectively, as compared to calculated contents of 67.46, 4.45 and 28.10 percent, respectively.

EXAMPLE 2

10 Grams of 5-(4-(dimethylamino)phenyl)-5,6-dihydrotetrazolo(1,5-c)-quinazoline was dissolved in 100 milliliters of dimethylformamide. The solution was stirred and excess hydrogen chloride was bubbled into the solution for 30 seconds. After about 60 seconds a finely divided red crystalline solid began to precipitate. When most of the solid had settled, the reaction mixture was refrigerated, then filtered and the cherry red solid washed with dimethylformamide and dried in air. The 5-[4-(dimethylamino)phenyl]-5,6-dihydrotetrazolo(1,5-c)-quinazoline hydrochloride product was recrystallized from absolute ethanol and found to melt at 206°–207°C.

In a similar procedure, 5-[4-(dimethylamino)-phenyl]-5,6-dihydrotetrazolo(1,5-c)quinazoline 4-toluenesulfonate, melting at 217°–218°C., is prepared by treating the free base with excess 4-toluenesulfonic acid.

The compounds of the invention can be administered to animals in the study of chemical effects on the cardiovascular system, and are particularly useful as fibrinolytic agents. The compounds are typically administered to mammals at varying dosage rates depending upon route, size, age and species of animal; and effect to be produced. They can be formulated and administered according to known procedures.

Fibrinolytic activity of the tetrazoloquinazoline compound is indicated by its effect on decreasing the time required for lysis of euglobulin clotted with calcium chloride. In such operations, test animals are anesthetized. Blood samples are withdrawn, and citrated and centrifuged to separate plasma. The plasma is centrifuged at pH 5.3 and the precipitate separated and dissolved in pH 7.4 buffer to obtain a euglobulin solution. This solution is clotted by addition of 0.025 molar calcium chloride, incubated at 37°C. and observed for clot lysis.

Lysis times are determined twice on each test animal prior to administration of the test compound, and compared to the lysis times determined from blood samples withdrawn at intervals after administration of the test compound. In a representative operation carried out with a group of rats, the mean lysis time 60 minutes after intravenous administration of 12 milligrams of 5-[4-(dimethylamino)phenyl]-5,6-dihydrotetrazolo(1,5-c)quinazoline per kilogram is 118 minutes as compared to 145 minutes for a check group administered sodium chloride solution. In another operation carried out with dogs, intravenous administration of 10 milligrams of 5-[4-(dimethylamino)-phenyl]-5,6-dihydrotetrazolo(1,5-c)quinazoline hydrochloride is found to produce 18, 27.9 and 22 percent decreases in lysis time 15, 30 and 60 minutes after administering the test compound.

What is claimed is:

1. A compound selected from the group consisting of 5-[4-(dimethylamino)phenyl]-5,6-dihydro-tetrazolo(1,5-c)quinazoline and a pharmaceutically-acceptable acid addition salt thereof.

2. A compound of claim 1 wherein the compound is 5-[4-(dimethylamino)phenyl]-5,6-dihydro-tetrazolo-(1,5-c)-quinazoline hydrochloride.

* * * * *